Feb. 22, 1944.                    W. H. SILVER                    2,342,306
                                    LISTER
                              Filed Nov. 1, 1940              2 Sheets-Sheet 1

INVENTOR:
WALTER H. SILVER
BY
ATTORNEYS.

Feb. 22, 1944.  W. H. SILVER  2,342,306
LISTER
Filed Nov. 1, 1940  2 Sheets-Sheet 2

INVENTOR:
WALTER H. SILVER
BY
ATTORNEYS.

Patented Feb. 22, 1944

2,342,306

UNITED STATES PATENT OFFICE 2,342,306

LISTER

Walter H. Silver, Moline, Ill., assignor to Deere & Company, Moline, Ill., a corporation of Illinois Application November 1, 1940, Serial No. 363,857

31 Claims. (Cl. 97—50)

The present invention relates generally to agricultural implements and more particularly to listers, bedders and similar implements embodying generally an implement frame connected at its forward end with a tractor and carrying at its rear end a transverse tool bar to which tools of various kinds may be fixed.

The object and general nature of this invention is the provision of new and improved lifting and controlling connections whereby the implement may be used either with or without gauge wheels. More specifically, it is a feature of this invention to provide a bedder so constructed and arranged that the same depth adjusting and lifting connections may be employed, regardless as to whether gauge wheels are employed to secure depth adjustment or whether the operating position of the implement is controlled directly from the tractor.

An additional feature of this invention lies in the provision of new and improved depth adjusting connections whereby, in the absence of gauge wheels, the weight of the implement frame may in operation be imposed upon the power lift mechanism of the tractor, such connections being particularly arranged so as to receive gauge wheels and to react against the latter for controlling the depth of operation of the tools, thereby relieving the tractor power lift of the weight of the frame and associated parts. Another feature of this invention is the provision of means for preventing lateral tilting of the implement when in operation. This is particularly important when tools are disposed at a wide setting in which it sometimes occurs that one tool tends to run deeper than the other, resulting in the latter rising out of the ground. According to this invention means is provided, preferably associated with the rock shaft of a tractor power lift apparatus, whereby either side of the implement frame is prevented from being lifted higher than the other side, yet without interfering with the vertical movement of the implement frame as a whole relative to the tractor.

These and other objects and advantages of the present invention will be apparent to those skilled in the art after a consideration of the following detailed description taken in conjunction with the accompanying drawings, in which.

Figure 1:
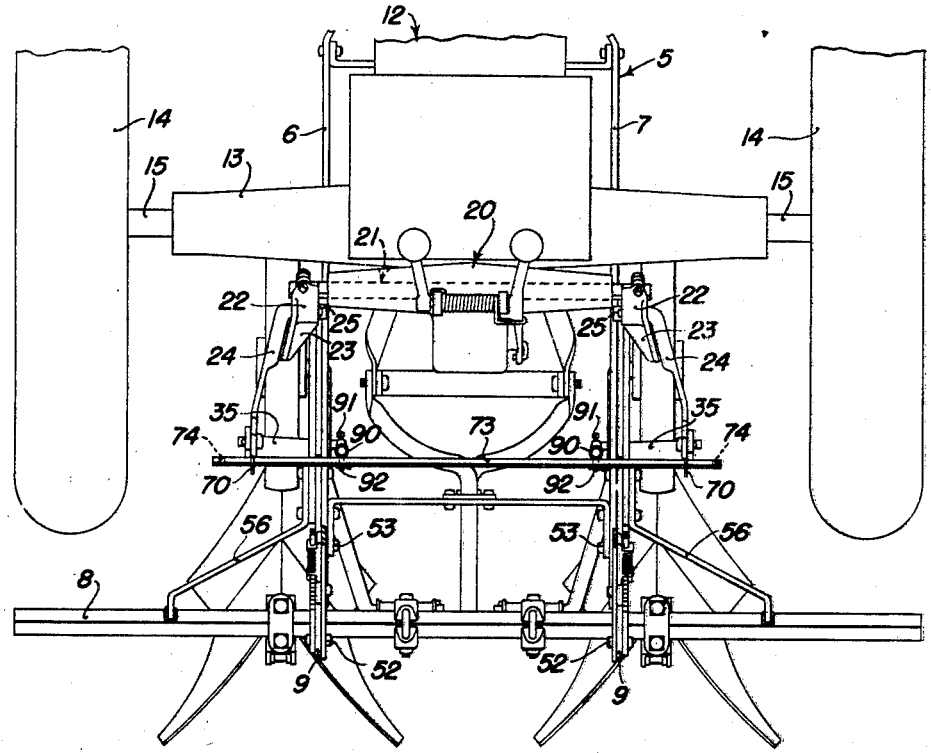
Figure 1 is a plan view of an agricultural implement in which the principles of the present invention have been incorporated, showing a two-row lister planter equipped with gauge wheels disposed in their narrow setting.

Referring now more particularly to the drawings, the agricultural implement in which the principles of the present invention have been incorporated and which has been chosen for illustration in the drawings, is generally of the type shown and described in detail in my prior Patent 2,196,037, issued April 2, 1940, to which reference may be had if necessary. The agricultural implement of the present invention comprises an implement frame, indicated in its entirety by the reference numeral 5, that includes a pair of generally fore and aft extending frame bars 6 and 7 to the rear end of which is fixed a transverse tool bar 8 by any suitable means, such as brackets or plates 9 welded to the tool bar 8 and bolted, respectively, to the rear ends of the frame bars 6 and 7. The implement frame 5 is connected by suitable hitch means to the forward portion of the tractor so that the implement frame is capable of generally vertical swinging movement relative thereto, such hitch means usually including yielding cushioning springs and is generally of the construction shown in my prior patent mentioned above. The tractor to which the implement frame is connected is indicated in its entirety by the reference numeral 12 and is of more or less conventional construction, including a rear axle housing 13, rear wheels 14 fixed to axle shafts 15. The tractor also includes power lift mechanism 20, preferably of the type shown in the prior patent to Theophilus Brown 2,197,848, issued April 23, 1940, which includes a transverse rock shaft 21 to which power lift arms 22 are fixed. Each power lift arm includes a casting 23 clamped to the associated end of the rock shaft 21 and an arm extension 24 pivotally connected, as at 25, to the casting 23 and which, according to the present invention, is formed to extend upwardly, as at 26, which upward extension is provided with a plurality of apertures 27. It will be seen, particularly from Figure 3, that the rear or outer end of each casting 23 carries an adjustable stud 29 which engages the under side of the associated arm extension 24 whereby when the power lift mechanism is actuated to rock the transverse shaft 21, the arms 23 engage the arm extensions 24 to rock the same upwardly. If, however, the rock shaft 21 is in its lower position, the arm extensions 24 are capable of free upward floating or pivotal movement relative to the power lift arm sections 23.

The tool bar 8 is adapted to receive any suitable ground working or furrow forming tools, such as middlebreaker bottoms, plow sweeps, disk gangs, or the like, with or without planting attachments, as is conventional with this type of implement. In order to illustrate the principles of the present invention, I have shown middlebreaker bottoms 30 fixed in any suitable way to beams 31 that are clamped, as at 32, to the tool bar at suitable laterally spaced positions, depending upon the number of tools employed, row spacing, and other factors. It will be understood, of course, that other types of bottoms or furrow openers, such as sweeps or lister bottoms, with or without planting units, disks for bedding, spring tooth attachments and the like may be employed where required.

One of the principal features of the present invention is the provision of connections whereby the power lift mechanism of the tractor may be employed for raising the tools into their transport position or lowering them into their working position, and connections for manually adjusting the operating position of the tools, which latter connections are adapted to react either against ground engaging gauge wheels or against the tractor itself in determining and adjusting the operating depth. Such connections will now be described. The connections at each side of the implement are substantially identical with those at the other side, and hence a description of one will suffice.

A vertically disposed link member 35, provided with a plurality of holes 36, is pivotally connected, as by a pin 37 disposed in one of the holes 27 in the associated power lift arm, with the tractor power lift and at its lower end is bent laterally inwardly and downwardly and is connected by a pivot 41 to a generally longitudinally extending link member 42 pivotally connected at its forward end to a pivot 43 carried on the associated frame bar of the implement frame 5. The rear end of the link member 42 carries a pivot 45 to which the lower end of a link 46 is connected. The upper end of the link 46 receives a pivot 47 carried by a hand lever 48, and the latter is provided with conventional latch mechanism 49 cooperating with a sector 51 that is fixed by any suitable means, such as bolts 52 and 53 to the implement frame, preferably to the associated attaching bracket 9. The bolt 53 receives a guide bar 54 which cooperates with the bracket 9 to prevent the link 46 from shifting laterally out of the proper position. The link 46 extends downwardly between the bracket 9 and a bracing strap 56 welded at its rear and laterally outer end to the tool bar 8 and bolted, as at 57, to the bracket 9 and associated frame bar, all forming a part of the implement frame 5. The longitudinally extending link member 42 is provided with one or more additional holes 41a so that the pivot 41 receiving the lower end of the link 35 may be disposed in a plurality of longitudinally spaced positions.

The depth adjusting linkage at the other side of the implement is substantially identical with that just described, and hence further description is unnecessary.

Figure 4:
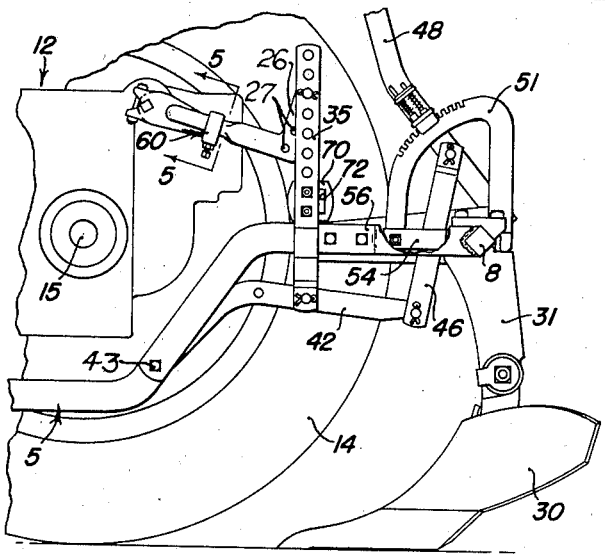
Figure 4 is a side view similar to Figure 3, showing the arrangement of the parts when gauge wheels are not used.

As mentioned above, the implement may or may not be provided with gauge wheels, according to conditions to be encountered and other factors, and where gauge wheels are not used, as in Figure 4, it will be seen that the weight of the frame is supported through the right and left hand links 35 by the power lift arms on the transverse power lift rock shaft 21, the weight of the frame and associated parts being imposed by the arm extensions 24 onto the power lift arm sections 23 through the adjusting studs 29. The implement frame may be adjusted vertically so as to increase or decrease the depth of operation of the tools 30 by moving the hand levers 48 in one direction or the other, thus varying the position of the implement frame relative to the lower ends of the links 35 by pivoting the longitudinally extending pivoted members 42. In other words, swinging either or both of the hand levers 48 downwardly reacts through the associated members 42 against the vertical links 35 to raise the rear end of the frame 5, and swinging the levers 48 upwardly lowers the rear end of the frame, thus adjusting the depth of operation of the tools.

The rear end of the implement frame is, of course, free to rise relative to the tractor by virtue of the free floating connection of the power lift arm extensions 24 relative to the power lift arm sections 23. However, the rear end of the frame is prevented from moving downwardly beyond the desired point by the power lift arm extensions 24 moving downwardly into contact with the studs 29, thus limiting the depth of penetration of the tools which is adjusted by the hand levers 48 as just described. Also, since the arm extensions 24 are capable of independent swinging movement, one side of the implement frame may rise relative to the other side, thus accommodating variations in the ground surface.

However, under certain conditions it may not be desirable to permit one side of the implement frame to rise relative to the other side. This is particularly true where relatively widely spaced apart tools are employed, such as when three tools are fixed to the tool bar 8 with the laterally outer tools disposed adjacent the laterally outer ends of the tool bar, which places the outer tools appreciably outwardly beyond the power lift arms so that if one outer tool tends to run deeper, that side of the frame swings downwardly about the adjacent power lift arm as a fulcrum, raising the other side of the implement frame. To accommodate conditions of this kind, the present invention provides means for locking the pivoted power lift arm sections 23, 24 together so that, in effect, both sides of the implement frame are connected to the rock shaft 21 whereby neither side of the frame can rise relative to the other side, yet the frame as a whole may move upwardly relative to the tractor when the power lift shaft 21 is permitted to rock. Usually, as disclosed in the Brown patent identified above, the power lift rock shaft 21 is free to rotate in one direction but is locked against rotation in the other direction beyond a certain point, depending upon whether the rock shaft 21 is in its raised or its lowered position.

Figure 5:
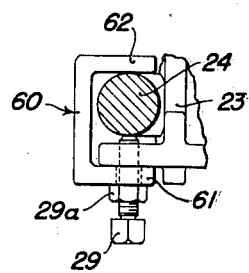
Figure 5 is a detail view of one of the clips for locking the implement frame to the power lift rock shaft when employing widely spaced tools but without gauge wheels.

Referring now to Figure 5, in order to lock the arm extension 24 into its associated power lift arm section 23, I provide a U-shaped clip 60 having one ear 61 apertured so as to receive the adjustable stud 29 and a second ear 62 that is adapted to be engaged over the adjacent portion of the power lift arm extension 24. A lock nut 29a, which is generally used with the adjustable stud 29, serves to lock the latter against rotation, whether or not the clip 60 is employed. When it is desired to lock the arms 23 and 24 against relative movement, the stud 29 is removed from the arm 23 and is passed through the opening in the ear 61 and is then threaded back into the end of the arm 23. Next the lock nut 29a is threaded forwardly on the stud 29 so as to clamp the clip 60 firmly against the end of the arm 23. In doing this the lock nut 29a thus holds the stud 29 against rotation. It will be noted that by loosening the lock nut 29a, the stud 29 may be screwed forwardly so as to force the end of the arm 24 firmly against the ear 62 of the clip 60. There is, of course, a clip 60 associated with each power lift arm, and when the clips are attached and affixed as shown in Figure 5, both sides of the frame may rise and fall together when the power lift shaft 21 rocks, but the frame 5 is prevented from tipping laterally, even though the laterally outer tools may be appreciably beyond the adjacent point of connection between the implement frame and the tractor.

As mentioned above, the depth controlling and lifting and lowering connections have been particularly designed to accommodate gauging the depth of operation of the tools either from the tractor or from gauge wheels. Generally speaking, the depth of operation may be satisfactorily controlled directly from the tractor, particularly if the latter is equipped with pneumatic tires, when sweeping middles, planting on beds, or using disk gang attachments. However, under other conditions the use of gauge wheels to gauge the depth of operation, permitting the implement to float relative to the tractor, is preferable, as when employing tools that are widely spaced, thereby eliminating the necessity of locking the power lift arms by the clips 60, or when employing lister bottoms in which the depth of operation would be affected by any tendency for the tractor wheels to dig in if the draft should become excessive. With the use of gauge wheels the depth of operation is independent of the position of the implement relative to the tractor.

According to the present invention, in order to utilize the above described connections while employing ground engaging gauge wheels, I provide a clip 70 for each lifting link 35, fixing each clip 70 to the associated link by bolts 71 or the like. The clips 70 are apertured as at 72 (Figure 4) to receive a cross bar or tie bar 73. The ends of the latter are provided with two or more apertures 74, preferably being arranged so that one aperture is in the end portion of the tie bar 73 extending laterally outwardly beyond the associated clip 70 while the other aperture is laterally inwardly of the clip. A bearing casting 76 having a U-shaped notch, a clamping cap 77 and a pair of clamping bolts 78 is fixed to the tool bar 8 at each side of the tractor, and the bearing sleeve section 81 of the bearing casting 76 receives the laterally turned end 82 of a gauge wheel crank axle 83. The forward end 84 of the latter receives the gauge wheel 85, the latter being journaled thereon by any suitable bearing means. The angularity of the gauge wheel crank axle sections 82 and 84 and the angular disposition of the bearing section 81 are such that the proper pitch is given to the gauge wheel 85. At a point rearwardly of the wheel receiving section 84, each gauge wheel crank axle 83 is apertured to receive the laterally turned end 87 of adjustable link means 88, connecting the gauge wheel crank axle with the adjacent end of the cross bar 73. The link means 88 includes the link member 89 having the laterally turned end 87 and an adjusting sleeve 90 carrying a set screw 91 and a pivot 92 which is adapted to be disposed in either of the openings 74. The set screw 91 holds the link parts 89 and 90 in adjusted position.

Figure 3:
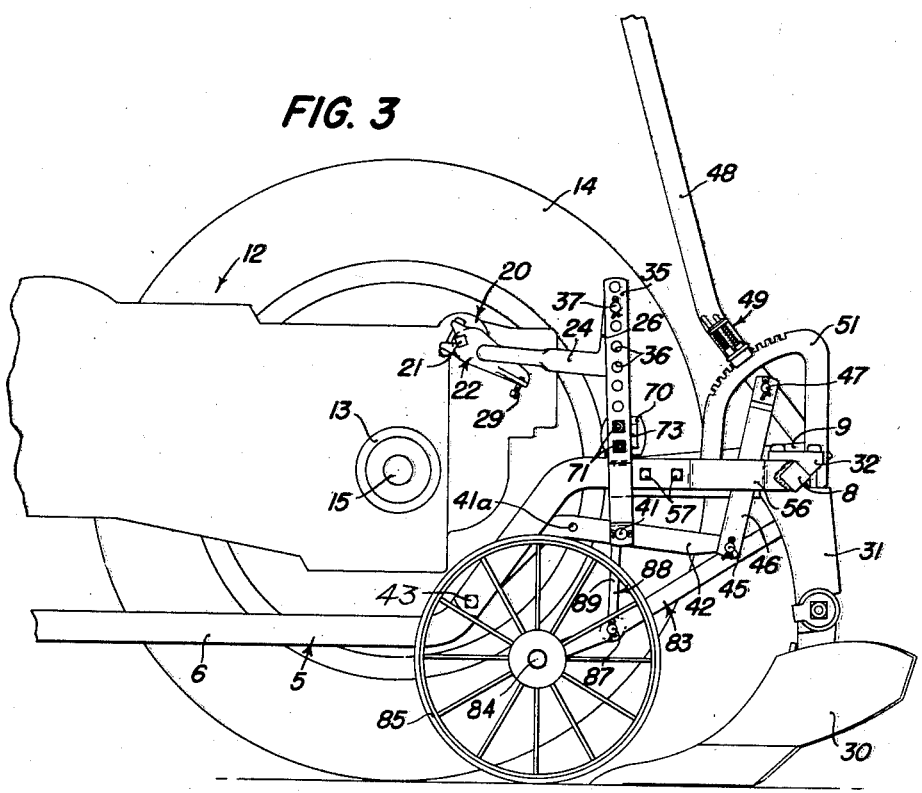
Figure 3 is a side view of the rear portion of the implement shown in Figure 1.

Usually the parts are so adjusted that the gauge wheels run at about the same level as the tools, as shown in Figure 3, but if it is desired to have the wheels run lower, as when sweeping off the tops of the beds with the gauge wheels running down in between the beds, the rods 89 may be extended. If, on the other hand, it is desired to have the wheels 85 run higher than the tools, the clips 70 may be raised on the links 35, as by placing the bolts 71 in some of the upper holes 36. Preferably, however, the set screws 91 (Figure 1) are loosened and the rods 89 raised in the sleeves 90.

As best shown in Figure 3, when gauge wheels are employed the pivot 37 is disposed in one of the upper openings 36 in the lifting link 35 so that when the tools are in normal operating position the power lift arm extensions 24 occupy a position well above the limit studs 29 whereby, during operation, the implement frame may as a whole float vertically relative to the tractor, the operating depth being controlled by the gauge wheels 85. When the depth of operation is controlled by the gauge wheels, the position of the implement frame relative to the gauge wheels is governed by the same hand levers 48 and associated linkage that is employed when gauging the depth of operation from the tractor, since the cross bar 73 to which the two gauge wheels are connected by the link means 88 and the clips 70 serve to connect the gauge wheels with the pivoted members 42, the position of which may be varied relative to the implement frame 5 by swinging the hand levers 48. In other words, when no gauge wheels are employed, the power lift arm extensions 24 rest against the studs 29 on the arm sections 23 whereby swinging movement of either or both of the hand levers 48 reacts through the links 35 against the power lift mechanism of the tractor for raising or lowering the implement frame 5, but when gauge wheels are employed these same connections, adjusted so that the power lift arms float, transmit the reaction through the links 88 to the gauge wheels whereby rocking movement of the same hand levers 48 now raises and lowers the implement frame 5 relative to the gauge wheels, thus varying the depth of penetration of the tools. It will be seen, therefore, that this construction is a simplification over prior constructions and, in particular, leaves the tool bar 8 clear of all parts which may tend to interfere with the proper adjustment and spacing of the tools to be connected to the tool bar 8. The several openings 36 in the links 35 and the plurality of openings in the power lift arm extensions 24, and particularly in the extending parts thereof, provide for adjustment of the lifting and depth controlling linkage to accommodate different sizes of tractors and different conditions of operation. For example, a wide range of adjustment is usually necessary to change the implement from listing to relisting, due to the different points on the ground where the gauge wheels and/or the tractor wheels run.

Figure 2:
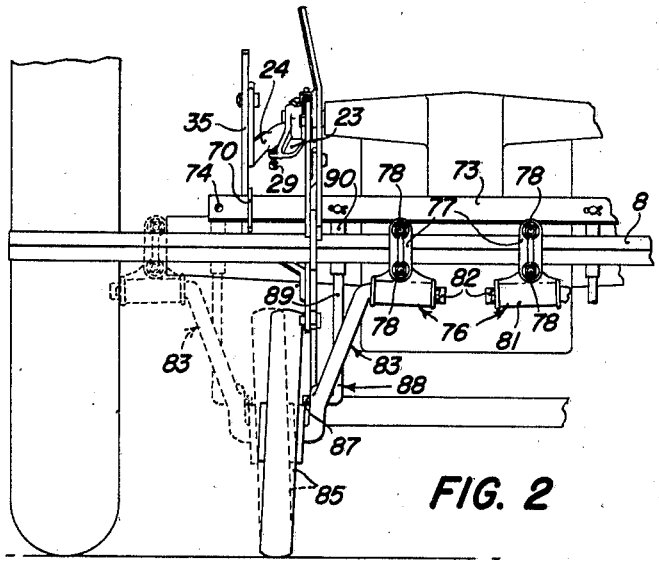
Figure 2 is a rear view of the machine shown in Figure 1.

The gauge wheel crank axles 83 may be disposed in various positions along the bar 8, and when desired the right and left hand crank axles may be interchanged to secure additional adjustments. For example, referring to Figure 2, the bearing castings 76 may be disposed in laterally outer positions, as shown in dotted lines in Figure 2. In either arrangement, each crank axle and the associated gauge wheel may be moved along the bar 8 to different positions.

While I have shown and described above the preferred structure in which the principles of the present invention have been incorporated, it is to be understood, in fact, that my invention is not to be limited to the particular details shown and described, but that widely different means may be employed in the practice of the broader aspects of my invention.

What I claim, therefore, and desire to secure by Letters Patent is:

1. An agricultural implement comprising means serving as a supporting frame, an implement frame connected therewith for vertical movement relative thereto, a ground working tool mounted on said implement frame, raising and lowering means including a transverse rock shaft on said supporting frame, a pair of arms pivoted to said implement frame for generally vertical movement substantially beneath said rock shaft, arms on the latter, generally vertical links connected at their upper ends to said last-mentioned arms and at their lower ends to said first mentioned arms, means on said implement frame connected with said first-mentioned arms for swinging the latter relative to the implement frame and reacting against said raising and lowering means for adjusting the position of the implement frame relative to said supporting frame, and gauging means optionally connectible with said arms on said implement frame for gauging the depth of operation of said tool, said rockshaft arms being swingable upwardly relative to said rockshaft, and stop means for limiting the extent of downward movement of said arms, whereby the latter serve as gauging means for said tool in the absence of said gauging means.

2. An agricultural machine comprising the combination of a tractor having a power lift and a pair of power lift arms operated thereby, said arms being freely movable in one direction relative to said power lift, an implement frame movably connected with said tractor, a pair of arms pivotally mounted on said implement frame, links connecting said pair of arms with said power lift arms, respectively, adjusting means on said implement frame operatively connected with said implement frame arms for adjusting the position of the implement frame relative to the tractor, said implement frame being freely movable upwardly by virtue of the movement of said power lift arms relative to said power lift, and gauge wheel means optionally mountable on said implement frame arms whereby the position of said frame can be determined either by said lift arms or by said gauge wheel means.

3. In an agricultural implement adapted to be attached to a tractor having a power lift, an implement frame, a part movably connected with said frame, ground-engaging gauge means connected with said part, lost motion means connecting said part with said power lift, and means connected with said frame and said part and reacting through the latter against said gauge means for adjusting the operating position thereof, operation of said power lift acting through said part for raising and lowering said frame.

4. In an agricultural implement adapted to be attached to a tractor having a power lift, an implement frame, a part pivotally connected with said frame, means carried by the latter for adjusting the position of said part relative to said frame, means establishing a one-way connection between said part and said tractor power lift, whereby actuation of the latter in one direction raises said frame and movement of the power lift into its other position accommodates floating movement of said implement frame relative to the tractor, and ground engaging gauge wheel means operatively connected with said part whereby operation of said adjusting means reacts through said part against said gauge wheel means for adjusting the position of said implement frame relative to the ground.

5. In an agricultural implement adapted to be attached to a tractor having power lift mechanism movable from one position to the other and including a part capable of independent movement away from the power lift, an implement frame, a member movably mounted on said frame, link means extending from said member to said part, adjusting means carried by said frame and operatively connected with said member for adjusting the operating position of said frame by reacting against said tractor power lift, said frame being movable relative to the tractor by virtue of the movement of said part on the tractor relative to the power lift, and ground engaging gauge means optionally connectible with said member and arranged to sustain the weight of the implement in operating position.

6. In an agricultural implement adapted to be attached to a tractor having a power lift, a frame, a depth adjusting lever pivoted thereon, a gauge wheel movably connected with said frame, connections between said lever and said gauge wheel whereby the position of the frame may be adjusted relative to said wheel, and means extending from said connections to said power lift whereby the latter may be actuated to raise both said frame and said wheels.

7. In an agricultural implement adapted to be attached to a tractor having power lift mechanism including a pair of arms rockable from raised to lowered position and arm extensions pivoted to said arms and adapted to be rocked in one direction thereby, an implement frame adapted to be movably connected with the tractor, a member pivotally connected with said frame at each side thereof, a pair of links pivoted, respectively, to said members and extending upwardly and operatively connected with said arm extensions, respectively, and a pair of depth adjusting levers carried by said frame and operatively connected, respectively, with said members.

8. An agricultural implement as defined in claim 7, further characterized by a pair of gauge wheels operatively connected with said links to be raised and lowered relative to the implement frame by the operation of said adjusting levers.

9. An agricultural implement as defined in claim 7, further characterized by a cross bar adapted to be connected with said links, a pair of gauge wheel crank axles adapted to be rockably connected with said implement frame, gauge wheels journaled on said crank axles, and connecting means extending from the latter to said cross bar whereby operation of said adjusting levers raises and lowers the frame relative to said gauge wheels and operation of said tractor power lift in said one direction raises both said implement frame and the gauge wheels relative to the tractor.

10. The combination with a tractor having power lift mechanism for raising and lowering implements and the like, of an implement frame movably connected with the tractor, gauge wheel means movably connected with said implement, means connecting said gauge wheel means with said power lift mechanism, and means connected with said last mentioned connecting means for adjusting the position of said implement frame relative thereto.

11. The combination as set forth in claim 10, further characterized by said connecting means including separable parts and said gauge wheels being removable from said implement frame, whereby when said gauge wheels are removed said adjusting means reacts against said power lift for adjusting the position of said implement frame and whereby when said gauge wheels are attached to said implement frame and connected with said power lift, said adjusting means reacts against said gauge wheels for adjusting the position of the implement frame.

12. An agricultural implement comprising an implement frame comprising generally longitudinally extending frame bars and a rear transverse tool bar, a part pivotally connected with each of said longitudinally extending frame bars and swingable generally vertically relative thereto, a pair of adjusting levers pivotally connected with said implement frame and operatively connected, respectively, with said pivoted members, a pair of gauge wheel crank axles, each having a gauge wheel journaled thereon, means adapted to connect said crank axles at different positions along said tool bar, a transversely disposed cross bar operatively connected adjacent its opposite ends with said pivoted members, respectively, and means connecting each crank axle with said cross bar at different points adjacent the associated end thereof whereby operation of either or both of said adjusting levers serves to raise or lower the implement frame relative to said gauge wheels and to accommodate different positions of the gauge wheel crank axles along said tool bar.

13. An agricultural implement as defined in claim 12, further characterized by means connected with said pivoted members for raising both said implement frame and said gauge wheels to their transport position.

14. An agricultural implement comprising an implement frame including a pair of generally longitudinally extending frame bars and a transversely disposed tool bar connected to the rear ends of said frame bars, a gauge wheel crank axle disposed adjacent each end of said tool bar, means adjustably connecting each crank axle with said tool bar at laterally different positions thereon, a generally longitudinally extending member pivotally connected at its forward end to each of said frame bars, a depth adjusting lever pivotally connected with said implement frame substantially in line with each of said frame members, a generally vertically disposed link connecting said lever with the associated pivoted member, a cross bar adapted to be connected optionally at different points to said pivoted members, whereby operation of either or both of the adjusting levers serves to shift said cross bar generally vertically, and adjustably extensible link means connected between each gauge wheel crank axle and said cross bar at laterally different positions on the latter to correspond to the lateral disposition of the associated crank axle.

15. An agricultural implement comprising means serving as a supporting frame, raising and lowering means carried by the latter, an implement frame movably connected with said supporting frame means, ground engaging gauge wheel means operatively connected with said implement frame, means on the latter for adjusting the position of said gauge wheel means relative to said implement frame, and means connected with said last mentioned means and having a one-way connection with said raising and lowering means on said supporting frame means whereby operation of said raising and lowering means in one direction acts to raise said implement frame.

16. An agricultural implement comprising a supporting frame, an implement frame connected therewith for vertical movement relative thereto, raising means on said supporting frame, adjustable means connected between said raising means and said implement frame, and means optionally associated with one of said means so that the position thereof is gauged from the ground, whereby said adjustable means reacts against said optionally associated means to determine the operative position of said implement frame relative to the ground, operation of said raising means serving to raise said implement frame into inoperative position through said adjustable means.

17. An agricultural implement comprising an implement frame, a transverse part connected therewith for generally vertical movement, means on said frame for shifting said part relative thereto, and a pair of laterally spaced gauging means connected with the end portions of said part for gauging the position of said frame.

18. An agricultural implement comprising an implement frame, a transverse part connected therewith for generally vertical movement, means for selectively shifting opposite ends of said part relative to said frame, and gauging means connected with the end portions of said transverse part.

19. An agricultural machine comprising an implement frame, a pair of adjustable levers movable on said frame, a transverse member connected with said levers, adjustable gauging means shiftably connected with said implement frame, and means connecting said gauging means with said transverse member in different lateral positions to correspond to the laterally adjusted position of said gauging means relative to said implement frame.

20. In an agricultural implement, an implement frame, a pair of generally vertically movable members connected with said frame, means to adjust the positions of said members, a pair of gauging means connected with said implement frame for vertical movement and for lateral adjustment relative thereto, a cross bar connected with said members, and means connecting said cross bar to said pair of gauging means and accommodating lateral adjustment of the latter.

21. An agricultural implement comprising an implement frame, depth gauging means laterally adjustable relative to said frame, a transverse bar mounted on said frame for generally vertical movement relative thereto, means for shifting said bar generally vertically, and link means connecting said bar and depth gauging means at different points along said bar to accommodate different positions of said gauging means.

22. An agricultural implement as defined in claim 21, further characterized by the means for shifting the transverse bar generally vertically comprising two separate means for moving the ends of said bar separately, whereby one gauging means can be moved relative to the other.

23. An agricultural machine comprising the combination with a tractor having raising means, of an implement frame movably connected with the tractor, an adjustable part on said frame, ground-engaging gauging means adapted to be optionally connected with said adjustable part, means connecting said part with said raising means, said connecting means including lost motion means adapted to be taken up when said raising means on the tractor is actuated, and removable clamping means for disabling said lost motion means to provide a rigid connection when said gauging means are not connected to said part.

24. In an agricultural implement adapted to be attached to a tractor having a power lift, a frame, a depth adjusting lever pivoted thereon, a gauge wheel movably connected with said frame, connections between said lever and said gauge wheel whereby the position of the frame may be adjusted relative to said wheel, and connecting means including lost motion connections extending between said power lift and said first connections whereby said frame may move relative to said tractor but when said power lift is actuated said frame is raised relative to the tractor.

25. In an agricultural implement adapted to be attached to a tractor having power lift mechanism including a rockshaft, a pair of arms rigidly mounted thereon, a second pair of arms pivotally connected to said arms, respectively, and swingable relative thereto in generally vertical planes, stop means on certain of said arms to limit the extent of swinging movement of said second arms in a downward direction, an implement frame adapted to be movably connected with the tractor, a member pivotally connected with said frame at each side thereof, a pair of links pivoted, respectively, to said members and extending upwardly and operatively connected with said second arms, respectively, whereby the height of said frame above the ground is gauged from said power lift arms, but either side of said frame is free to rise, clamping means for optionally fixing said second pair of arms to said rockshaft arms for the purpose described, and a pair of depth adjusting levers carried by said frame and operatively connected, respectively, with said members.

26. An agricultural implement comprising an implement frame, a member pivotally connected with said frame at each side thereof, a pair of depth adjusting levers carried by said frame and operatively connected, respectively, with said members, a cross bar connected with said members, a pair of gauge wheel crank axles rockably connected with said implement frame, gauge wheels journaled on said crank axles, and connecting means extending from the latter to said cross bar whereby operation of said adjusting levers raises and lowers the frame relative to said gauge wheels.

27. An agricultural implement comprising an implement frame including a transverse tool bar and generally longitudinally extending frame bars, a part pivotally connected with each of said longitudinally extending frame bars and swingable generally vertically relative thereto, a pair of gauge wheel crank axles, each having a gauge wheel journaled thereon, means adapted to connect said crank axles at different positions along said tool bar, a transversely disposed cross bar operatively connected adjacent its opposite ends with said pivoted members, respectively, means connecting each crank axle with said cross bar at different points adjacent the associated end thereof to accommodate different positions of the gauge wheel crank axles along said tool bar, and means acting through said gauge wheels for raising and lowering the implement frame.

28. The combination with a tractor having power lift mechanism for raising and lowering implements and the like, of an implement frame movably connected with the tractor, gauge wheel means movably connected with said implement frame and adjustable laterally relative thereto to accommodate different row spacing, a transversely disposed member connected to be raised and lowered by said power lift mechanism, means for adjusting the gauge wheel means relative to the implement frame, and means connecting said gauge wheel means with said member in different lateral positions of adjustment to accommodate the adjustment of the gauge wheel means relative to the implement frame, operation of said power lift mechanism acting through said gauge wheel adjusting means to raise said frame.

29. An agricultural machine comprising the combination of a tractor having power lift means, an implement frame connected with the tractor for generally vertical movement, ground-engaging gauge means connected for lateral adjustment with both said implement frame and said power lift means, and means adjustably fixing the gauge means to the implement frame to determine the vertical operating position of the latter.

30. An agricultural implement comprising an implement frame including a pair of generally longitudinally extending frame bars and a transversely disposed tool bar connected to the rear ends of said frame bars, a gauge wheel crank axle disposed adjacent each end of said tool bar, means adjustably connecting each crank axle with said tool bar at laterally different positions thereon, a generally longitudinally extending member pivotally connected at its forward end to each of said frame bars, a transverse member with which said crank axles are adapted to be connected in different positions of lateral adjustment, and depth adjusting means on the implement frame for raising and lowering said transverse member for adjusting the position of said gauge wheel crank axles relative to the implement frame.

31. An agricultural implement comprising an implement frame including a pair of generally longitudinally extending frame bars and a transversely disposed tool bar connected to the rear ends of said frame bars, a gauge wheel crank axle disposed adjacent each end of said tool bar, means adjustably connecting each crank axle with said tool bar at laterally different positions thereon, a generally longitudinally extending member pivotally connected at its forward end to each of said frame bars, a transverse member connected to intermediate portions of said longitudinally extending members, depth adjusting means on the implement frame connected to the rear portions of said longitudinally extending members for raising and lowering said transverse member, and adjustably extensible link means connected between each gauge wheel crank axle and said transverse member at laterally different positions on the latter to correspond to the lateral disposition of the associated crank axle.

WALTER H. SILVER.